(12) United States Patent
Steeber

(10) Patent No.: US 9,896,271 B1
(45) Date of Patent: Feb. 20, 2018

(54) CONVEYOR ACCUMULATOR FOR CONTROLLING THE FLOW OF ARTICLES BEING CONVEYED

(71) Applicant: Barry-Wehmiller Container Systems, Inc., St. Louis, MO (US)

(72) Inventor: Dorian F. Steeber, Fort Gibson, OK (US)

(73) Assignee: Barry-Wehmiller Container Systems, Inc., St. Louis, MO (US)

( * ) Notice: Subject to any disclaimer, the term of this patent is extended or adjusted under 35 U.S.C. 154(b) by 0 days.

(21) Appl. No.: 15/280,560

(22) Filed: Sep. 29, 2016

(51) Int. Cl.
  *B65G 1/00* (2006.01)
  *B65G 21/14* (2006.01)
  *B65G 37/00* (2006.01)

(52) U.S. Cl.
  CPC .............. *B65G 21/14* (2013.01); *B65G 1/00* (2013.01); *B65G 37/00* (2013.01)

(58) Field of Classification Search
  CPC .... B65G 15/26; B65G 21/14; B65G 47/5131; B65G 47/5122
  USPC .............................. 198/347.1, 588, 812, 594
  See application file for complete search history.

(56) References Cited

U.S. PATENT DOCUMENTS

| | | | |
|---|---|---|---|
| 2,932,376 A | 4/1960 | Millington | |
| 3,053,378 A | 9/1962 | Longenecker | |
| 3,173,557 A | 3/1965 | Gunnar | |
| 3,506,110 A | 4/1970 | Paul et al. | |
| 4,142,345 A | 3/1979 | Porter, Jr. | |
| 4,401,207 A | 8/1983 | Garvey | |
| 4,413,724 A | 11/1983 | Fellner | |
| 4,513,858 A | 4/1985 | Fellner et al. | |
| 4,549,647 A * | 10/1985 | Cosse | B65G 47/5131 198/594 |
| 5,007,521 A | 4/1991 | Tanaka | |
| 5,308,001 A | 5/1994 | Grecksch et al. | |
| 5,411,131 A | 5/1995 | Haegele | |
| 6,450,751 B1 | 9/2002 | Hollander | |
| 6,464,065 B2 | 10/2002 | Herubel et al. | |
| 6,497,321 B2 | 12/2002 | Horton et al. | |
| 6,591,963 B2 | 7/2003 | Wipf | |

(Continued)

FOREIGN PATENT DOCUMENTS

| | | |
|---|---|---|
| DE | 10312695 A1 | 10/2004 |
| EP | 0390241 A2 | 10/1990 |

(Continued)

OTHER PUBLICATIONS

Meurer Horizontal and Vertical Buffers at p. 2, http://www.meurer-gruppe.de/fileadmin/pdf/technische_infos/meurer_CM_HSP_VSP_d_engl.pdf.

(Continued)

*Primary Examiner* — James R Bidwell
(74) *Attorney, Agent, or Firm* — Thompson Coburn LLP

(57) ABSTRACT

A conveyor accumulator for conveying articles comprises first and second parallel rails, a turnaround wheel, an endless loop conveyor chain, an infeed drive device, and an outfeed drive device. Each of the rails comprises a support surface and a guide surface. The support surfaces slope downward as they extend outboard of the center plane of the accumulator. The turnaround wheel is movable between the guide rails. The conveyor chain is slideable along and supported against gravity by at least the support surfaces of the first and second rails and is prevented from moving outboard by the guide surfaces. The turnaround wheel is configured to move in a manner extending and, alternatively, contracting the path of the portion of the conveyor chain configured to hold articles. The turnaround wheel is configured and adapted to cause the conveyor chain to bank as the conveyor chain extends around the turnaround wheel.

13 Claims, 7 Drawing Sheets

(56) References Cited

U.S. PATENT DOCUMENTS

| | | | |
|---|---|---|---|
| 6,681,915 | B2 | 1/2004 | Pattantyus-Abraham et al. |
| 6,725,998 | B2 | 4/2004 | Steeber et al. |
| 8,092,140 | B2 | 1/2012 | Baker et al. |
| 8,770,377 | B2 | 7/2014 | Seger et al. |
| 8,877,128 | B2 | 11/2014 | Fukugaki et al. |
| 9,145,270 | B2 * | 9/2015 | Touitou ............. B65G 47/5131 |
| 9,212,008 | B2 | 12/2015 | Steeber |
| 9,415,947 | B2 | 8/2016 | Steeber |
| 2008/0257685 | A1 | 10/2008 | Huttner et al. |

FOREIGN PATENT DOCUMENTS

| | | | |
|---|---|---|---|
| FR | 2810653 | A1 | 12/2001 |
| JP | S58-31803 | B2 | 7/1983 |
| JP | H07267352 | A | 10/1995 |
| JP | 2004-010341 | A | 1/2004 |
| JP | 2008-050155 | A | 3/2008 |
| JP | 4601590 | B2 | 12/2010 |
| WO | 2008026478 | A1 | 3/2008 |

OTHER PUBLICATIONS

Meurer, Our Buffer Systems, http://www.meurer-gruppe.de/index.php? id=61&L=1.
Non-Certified English Translation of JP4601590 B2.
Third Party observations filed in corresponding European Patent Application No. 11847772.8 dated Oct. 17, 2014.
Non-Certified Partial Japanese to English Computer Conversion of JP 58-31803—contains Claims, Detailed Description and Description of the Drawings.

* cited by examiner

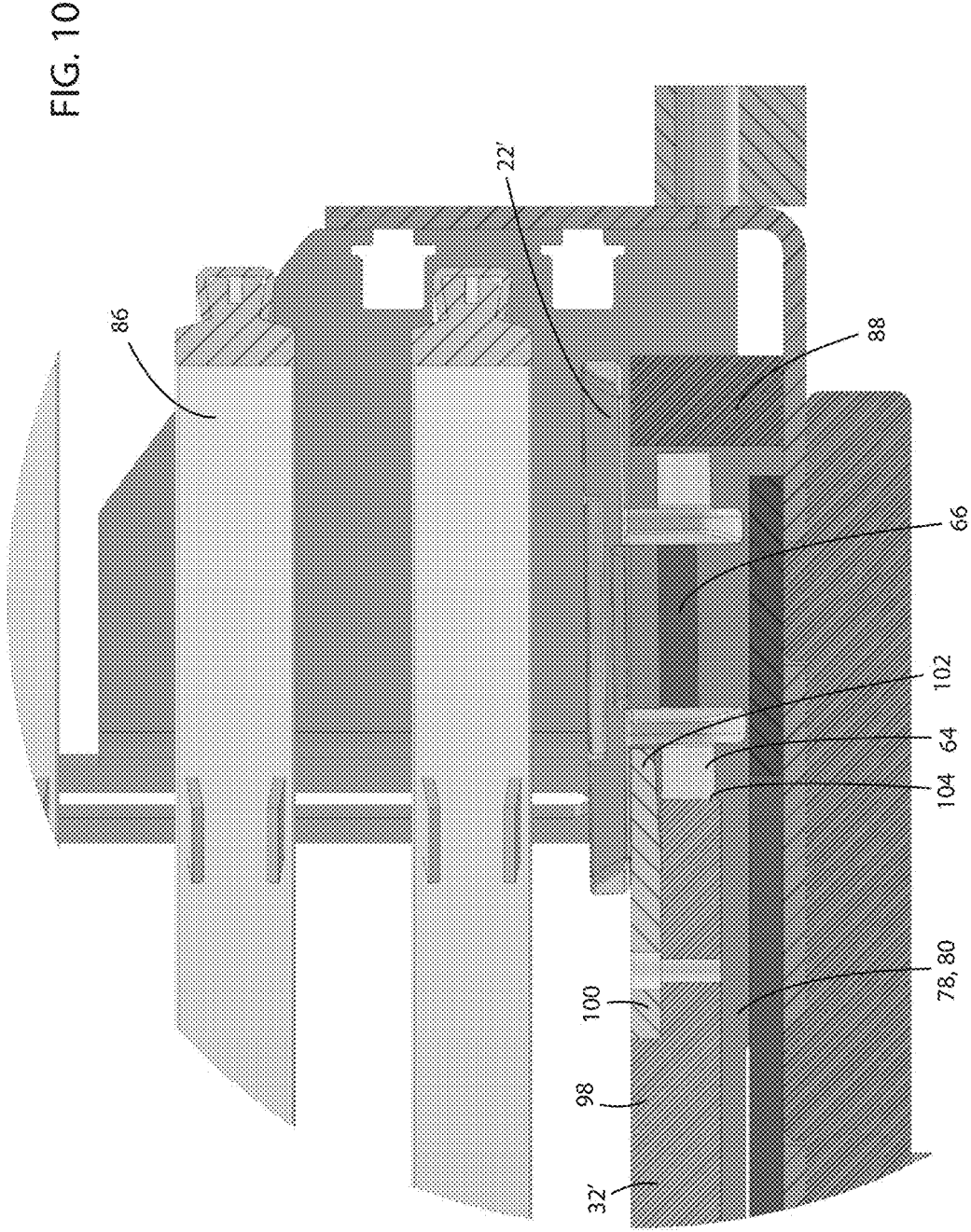

CONVEYOR ACCUMULATOR FOR CONTROLLING THE FLOW OF ARTICLES BEING CONVEYED

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention relates generally to equipment for conveying articles or goods along a path as they move between various stations along an assembly or packaging line. More particularly the present invention pertains to conveyor accumulators having a conveying surface that can adjust in total length to support more or less product/articles without altering the spacing of articles moving along or stopped on the assembly, processing or packaging line.

General Background

Product conveyor accumulators having a conveying surface that can adjust in total length to support more or less product are well known. For example, U.S. Pat. No. 9,212,008, which is hereby incorporated herein by reference in its entirety, discloses a multi-stage accumulator that consists of two accumulators having a conveying surface that can adjust in total length (described as infeed and outfeed accumulators) with a multi-lane accumulator operatively therebetween. The purpose of a product conveyor accumulator is to store or buffer articles moving along an assembly, processing or packaging line so that the entire line needs not be stopped when any given station of operation is not discharging or receiving the articles. For example, there may be an upstream station of operation that continuously discharges product at a given rate and a downstream station of operation that receives and discharges batches of articles/product periodically. If the downstream station of operation can periodically receive articles at a greater rate than such articles are discharged from the upstream station of operation, incorporating an accumulator operatively between the two stations can allow the upstream station to operate continuously without pausing periodically. Accumulators can also prevent disruptions in the overall product line when a station of operation temporarily shuts down (e.g., to be manually cleared of inferior or damaged product). Accumulators of the type disclosed in U.S. Pat. No. 9,212,008 have an advantage in situations where the spacing of articles moving along a line is critical. Unlike accumulators that operate via compression of the articles, the accumulators of the type disclosed in U.S. Pat. No. 9,212,008 do not alter the spacing or compression of articles moving along the line. It should be appreciated that other uses for accumulators are well known by those skilled in the art.

SUMMARY OF THE INVENTION

In one aspect of the invention a conveyor accumulator for controlling the flow of articles being conveyed comprises first and second rails, a turnaround wheel, an endless loop conveyor chain, an infeed drive device, and an outfeed drive device. The first and second rails are parallel to each other and define a parallel vertical center plane therebetween. Each of the rails comprises a support surface and a guide surface. The support surfaces slope downward as they extend outboard of the center plane. The turnaround wheel is movable along an axis parallel to the rails and is rotatable about a vertical axis that lies between the guide rails that, together with the turnaround wheel, is movable along the axis parallel to the rails. A portion of the conveyor chain has a path that extends along the first rail to the turnaround wheel, partially around the vertical axis of the turnaround wheel, and along the second rail. The portion of the conveyor chain is configured and adapted to convey products positioned thereon. The portion of the conveyor chain is slideable along and supported against gravity by at least the support surfaces of the first and second rails and is prevented from moving outboard from the center plane by the guide surfaces. Movement of the portion of the conveyor chain from the first rail to the second rail is guided by the turnaround wheel. The infeed drive device is operatively coupled to the conveyor chain in a manner such that the infeed drive device can allow and, alternatively, restrain movement of the portion of the conveyor chain on the first rail. The outfeed drive device is operatively coupled to the conveyor chain in a manner such that the outfeed drive device can induce and, alternatively, restrain movement of the portion of the conveyor chain on the second rail. The turnaround wheel is configured to move along the axis parallel to the rails in a manner extending and, alternatively, contracting the path of the portion of the conveyor chain in response to when the infeed and outfeed drive devices do not allow equal rates of movement of the conveyor chain.

In another aspect of the invention a conveyor accumulator for controlling the flow of articles being conveyed comprises first and second rails, a turnaround wheel supported by a sled, an endless loop conveyor chain, an infeed drive device, and an outfeed drive device. The rails are parallel to each other and define a parallel vertical center plane therebetween. Each of the rails comprises a support surface. The turnaround wheel together with the sled is movable along an axis parallel to the rails. The turnaround wheel is also rotatable about a vertical axis that lies between the guide rails that, together with the turnaround wheel and sled, is moveable along the axis parallel to the rails. A portion of the conveyor chain has a path that extends along the first rail to the turnaround wheel, partially around the vertical axis of the turnaround wheel, and along the second rail. The portion of the conveyor chain is configured and adapted to convey products positioned thereon and is slideable along and supported against gravity by at least the support surfaces of the first and second rails. Thus, the infeed device is operatively coupled to the conveyor chain in a manner such that the infeed device can allow and, alternatively, restrain movement of the portion of the conveyor chain on the first rail. The outfeed drive device is operatively coupled to the conveyor chain in a manner such that the outfeed feed drive device can induce and, alternatively, restrain movement of the portion of the conveyor chain on the second rail. The turnaround wheel and sled are configured to collectively move along the axis parallel to the rails in a manner extending and, alternatively, contracting the path of the portion of the conveyor chain in response to when the infeed and outfeed drive devices do not allow equal rates of movement of the conveyor chain. At least one of the turnaround wheel and the sled is configured and adapted to cause the conveyor chain to bank as the conveyor chain extends around the turnaround wheel.

In yet another aspect of the invention, a conveyor accumulator for controlling the flow of articles being conveyed comprises first and second rails, a turnaround wheel, an endless loop conveyor chain, and infeed and outfeed drive devices. The rails are parallel to each other and define a parallel vertical center plane therebetween. Each of the rails comprises a support surface. The turnaround wheel is movable along an axis parallel to the first and second rails and is rotatable about a vertical axis that lies between the guide rails that, together with the turnaround wheel, is movable along the axis parallel to the rails. A portion of the conveyor chain has a path that extends along the first rail to the turnaround wheel, partially around the vertical axis of the turnaround wheel, and along the second rail. The portion of the conveyor chain is configured and adapted to convey products positioned thereon and is slideable along and supported against gravity by at least the supporting surfaces of the first and second rails. Movement of the portion of the conveyor chain from the first rail to the second rail is guided by the turnaround wheel without the conveyor chain being vertically lifted from the first and second rails. The infeed drive device is operatively coupled to the conveyor chain in a manner such that the infeed drive device can allow and, alternatively, restrain movement of the portion of the conveyor chain on the first rail. The outfeed drive device is operatively coupled to the conveyor chain in a manner such that the outfeed feed drive device can induce and, alternatively, restrain movement of the portion of the conveyor chain on the second rail. The turnaround wheel is configured to move along the axis parallel to the rails in a manner extending and, alternatively, contracting the path of the portion of the conveyor chain in response to when the infeed and outfeed drive devices do not allow equal rates of movement of the conveyor chain.

Further features and advantages of the present invention, as well as the operation of the invention, are described in detail below with reference to the accompanying drawings.

BRIEF DESCRIPTION OF THE DRAWINGS

FIG. 10 depicts a detailed cross-sectional view of the product conveyor accumulator shown in FIG. 5 taken about a vertical plane parallel to the longitudinal direction of the accumulator and aligned with the rotational axis of the turnaround wheel, focusing on the engagement between the conveyor chain and the turnaround wheel.

Figure 1:
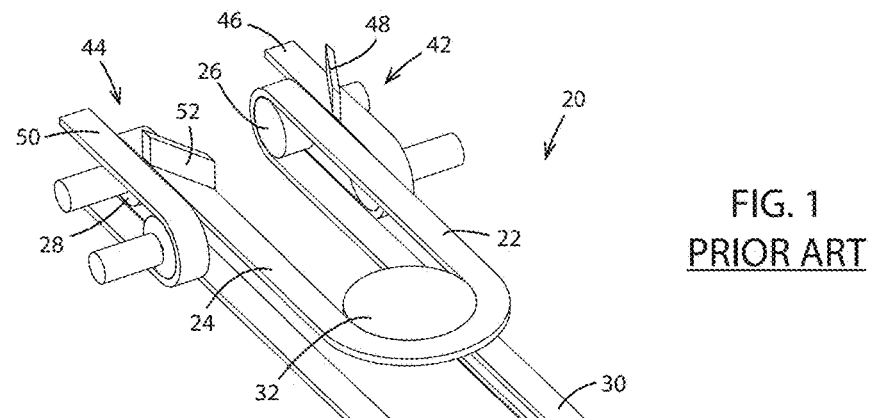
FIG. 1 depicts a product conveyor accumulator of the type to which this invention is directed, and is shown in a first operational configuration and with the supporting structure omitted for clarity.

Reference numerals in the written specification and in the drawing figures indicate corresponding items.

DETAILED DESCRIPTION

Figure 2:
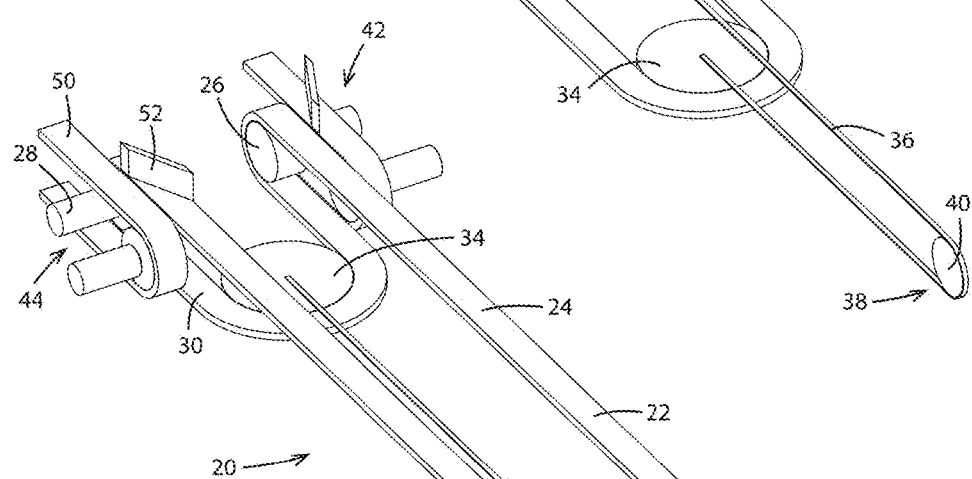
FIG. 2 depicts the product conveyor accumulator shown in FIG. 1 in a second operational configuration wherein the conveying surface/path is extended to a greater extent than it is in the first configuration.

A product conveyor accumulator (20) of the type to which this invention is directed is shown schematically in FIGS. 1 and 2 for purposes of describing the general operation of such conveyors. In general, the accumulator (20) comprises an endless loop conveyor chain (22) that provides an upper U-shaped portion (24) adapted to support articles being conveyed along a production, processing or packaging line. The conveyor chain (22) also wraps around an infeed drive device (26) and an outfeed drive device (28) and forms a lower U-shaped portion (30) (which is not intended to convey articles) beneath the portion of the upper U-shaped portion (24) of the conveyor chain (22). The upper and lower U-shaped portions (24, 30) can be driven by the infeed and outfeed drive devices (26, 28) in a manner such that the upper U-shaped portion extends in length while the lower U-shaped portion decreases in length (as is shown collectively by FIGS. 1 and 2), and vice versa. Thus, the upper U-shaped portion (24) of the conveyor chain (22) is capable of supporting and conveying more or fewer products thereon without altering the spacing of the products conveyed thereon. Typically, the outfeed drive device (28) will stop while the infeed drive device (26) operates at normal receiving speed if there is stoppage of the line immediately downstream of the accumulator (20). This expands the upper U-shaped portion of the conveyor chain (22), thereby allowing it to continue to receive the articles being conveyed without discharging articles. Conversely, the infeed drive device (26) can be stopped while the outfeed drive device (28) operates at normal discharging speed if there is stoppage of the assembly line immediately upstream of the accumulator (20). This contracts the upper U-shaped portion (24) of the conveyor chain (22), thereby allowing it to continue to discharge the articles being conveyed without receiving articles. In some cases, the infeed or outfeed device (26, 28) may be reversed (see example, U.S. Pat. No. 9,212,008). That is useful when articles are loaded onto or discharged from the accumulator (20) at various locations rather than at fixed locations. Regardless, it should be appreciated that whenever the infeed and outfeed drive devices (26, 28) operate at different speeds, the upper U-shaped portion (24) of the conveyer will either expand or contract while the lower U-shaped portion (30) will do the opposite.

As shown in FIGS. 1 and 2, such an accumulator (20) also comprises a movable upper turnaround wheel (32) and a movable lower turnaround wheel (34), around which the curved portions of the upper and lower U-shaped portions (24, 30) of the conveyor chain (22) respectively wrap. The turnaround wheels (32, 34) are connected to each other via a tether (36) that is secured to the distal end (38) of the accumulator (20) via one or more pulleys or rollers (40). Thus, the tether (36) is able to pull the upper turnaround wheel (32) toward the distal end (38) of the accumulator (20) when the lower turnaround wheel (34) moves toward the infeed and outfeed drive devices (26, 28) (by a differential between the rates of the infeed and outfeed drive devices), and vice versa. As explained in U.S. Pat. No. 9,212,008, the tether (36) preferably has some give provided by, for example, a belt/tether tension pulley (not shown in FIGS. 1 and 2).

As shown in FIGS. 1 and 2, such an accumulator (20) may also comprise fixed infeed and outfeed transfer points (42, 44). At such an infeed transfer point (42), articles can be transferred onto the upper U-shaped portion (24) of the conveyor chain (22) of the accumulator (20) from another article conveyor (46) (shown only partially) via an infeed transfer guide (48). Similarly, at such an outfeed transfer point (44), articles can be transferred off of the upper U-shaped portion (24) of the conveyor chain (22) of the accumulator (20) and unto another article conveyor (50) (shown only partially) via an outfeed transfer guide (52).

Figure 3:
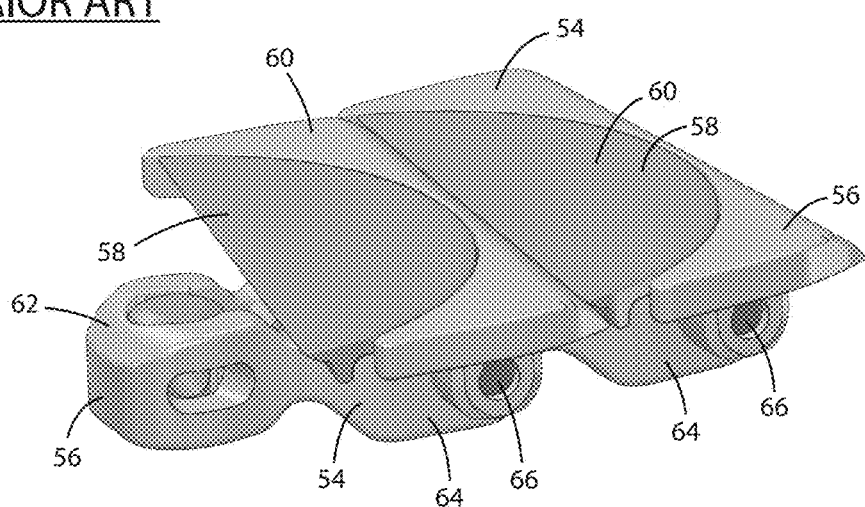
FIG. 3 depicts a perspective view of two links of a conveyor chain showing the conveying surface.
Figure 4:
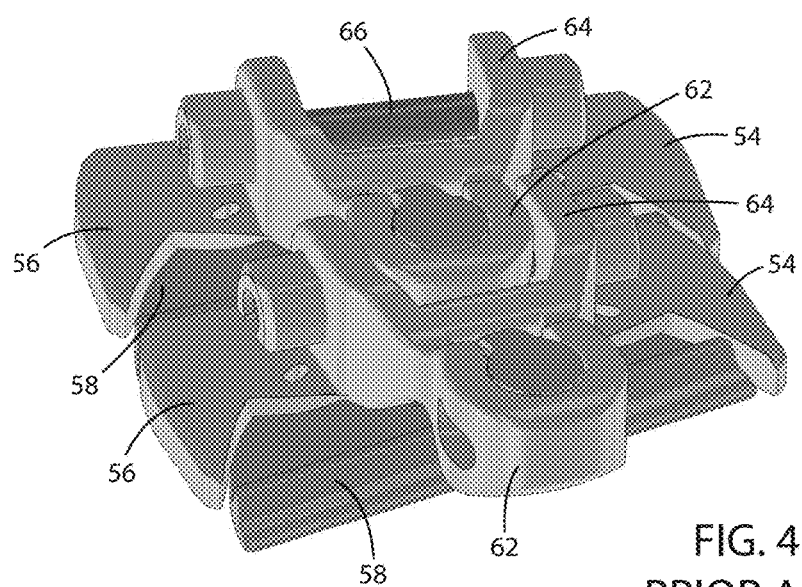
FIG. 4 depicts a perspective view of two links of a conveyor chain showing how the links are attached to each other beneath the conveying surface.

FIGS. 3 and 4 depict two links (54) of conveyor chain of the type that may be used with the present invention. That being said, it should be appreciated that the invention is not limited to using any particular conveyor chain. Each link (54) comprises a main portion (56) and a secondary portion (58) that are pivotally connected to each other about an axis running through the center of the nub (62) of the main portion (56). The main portion (56) and the secondary portion (58) each have a support surface (60) for supporting articles being conveyed. The main portion (56) also comprises a yoke (64) in which the nub (62) of the adjacent link (54) is nested. A hinge pin (66) passes through said yoke (64) and nub (62) to thereby secure said links (54) to each other. In view of the foregoing, it can be appreciated that such links (54) can pivot relative to each other about two perpendicular axes to thereby allow the conveyor chain to turn and bend in multiple directions.

Figure 5:
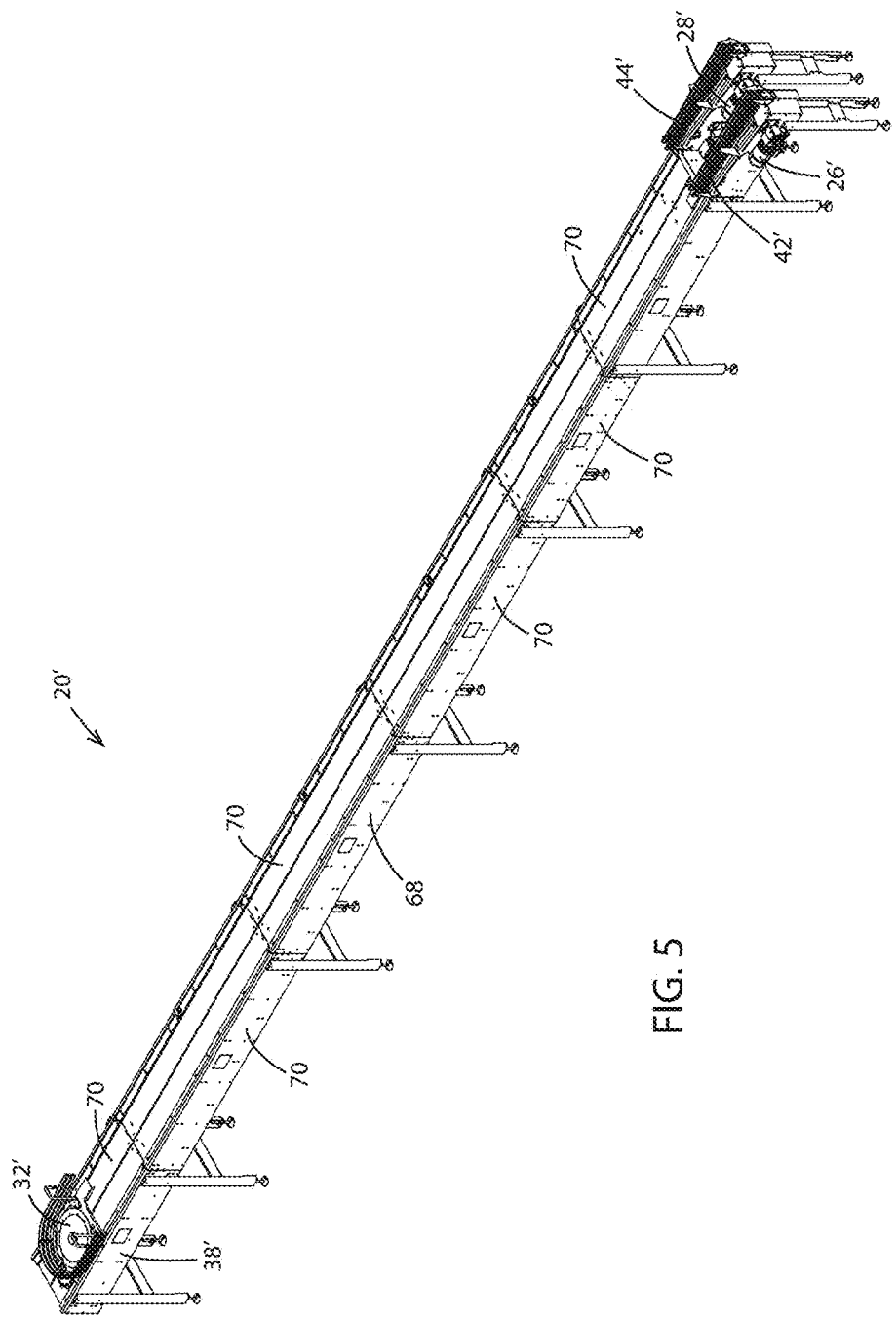
FIG. 5 depicts a perspective view of an embodiment of a product conveyor accumulator in accordance with the invention.
Figure 6:
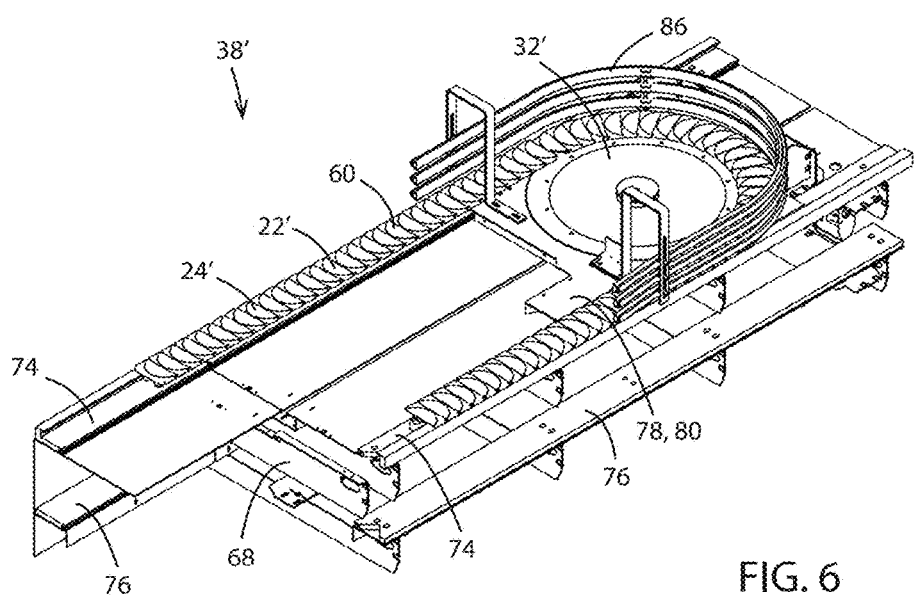
FIG. 6 depicts a portion of the product conveyor accumulator shown in FIG. 5 and shows the distal end of the product conveyor accumulator.

Having explained the basic operation of product conveyor accumulator (20) of the type to which this invention is directed, an embodiment of a product conveyor accumulator (20') in accordance with the present invention is shown in FIG. 5 and is described below. It should be appreciated that the accumulator (20') generally operates in the manner described above in reference to FIGS. 1 and 2 and has the same basic components.

Figure 7:
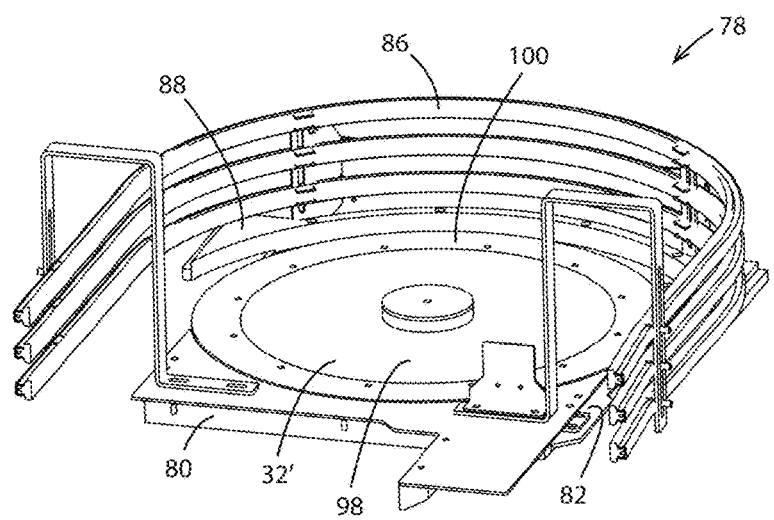
FIG. 7 depicts the upper turnaround wheel sled assembly of the accumulator shown in FIGS. 5 and 6.
Figure 8:
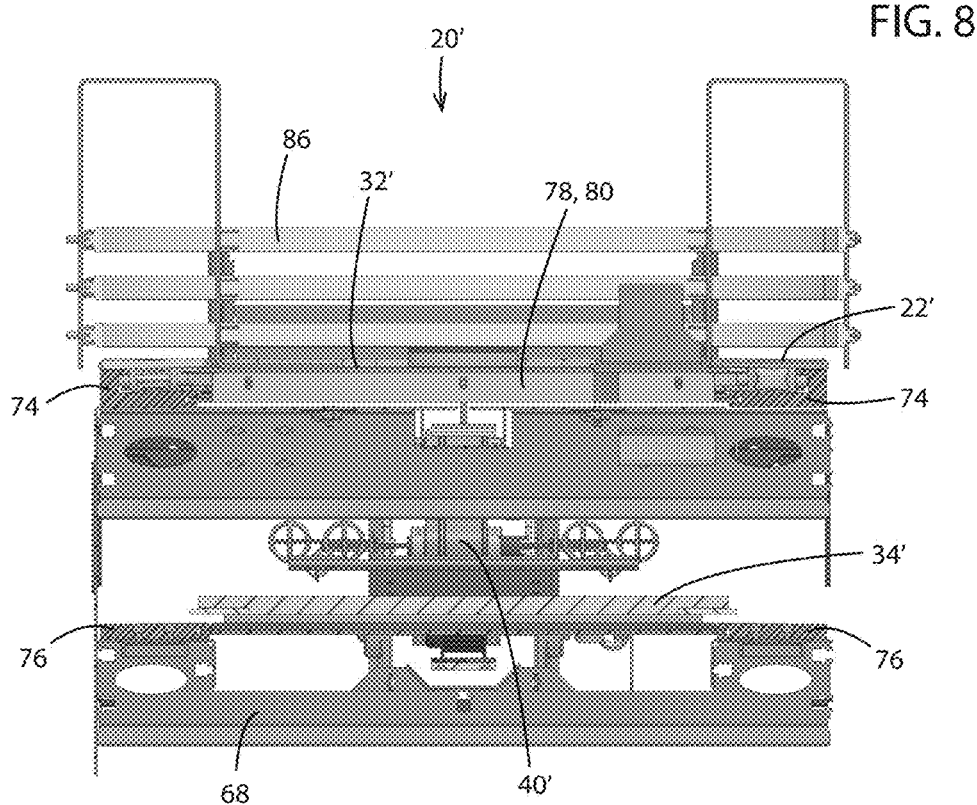
FIG. 8 depicts a cross-sectional view of the product conveyor accumulator shown in FIG. 5 taken about a vertical plane transverse to the longitudinal direction of the accumulator.

The accumulator (20') comprises an elongate frame (68) which is formed of modular sections (70) such that the length of the accumulator (20') can easily be produced in various lengths. The drive devices (26', 28') are located at a proximal end (72) of the accumulator (20'). The conveyor chain (22') rides on two upper rails (74) and two lower rails (76) that run nearly or entirely the entire length of the accumulator (20'). An upper turnaround wheel sled (78) is linearly movable along the longitudinal axis of accumulator (20') between the two upper rails (74). The upper turnaround wheel sled (78) is shown by itself in FIG. 7. The sled (78) comprises the upper turnaround wheel (32') and a non-rotatable sled base (80) that, as shown in FIGS. 8 and 9, comprises guide flanges (82) that cooperate with guide channels (described below) that are provided on the upper rails (74). The cooperation between the guide flanges (82) and the guide channels supports the sled base (80) via the upper rails (74) and allow the entire upper turnaround wheel sled (78) to move linearly along and between the upper rails. An optional turnaround fence (86) is preferably attached to the sled base (80) and ensures that articles being conveyed are not thrown off of the conveyor chain (22') as such articles take the turn around the upper turnaround wheel (32'). For ultra-high speed conveyor rates, the turnaround fence (86) could be in the form of a vertically oriented arcuate conveyor belt (not shown) having its speed linked to that of the conveyor chain (22') moving around the upper turnaround wheel (32'). An optional arcuate outer support member (88) is preferably attached to the sled base (80). The arcuate outer support member (88) partially encircles the upper turnaround wheel (32').

Figure 9A:
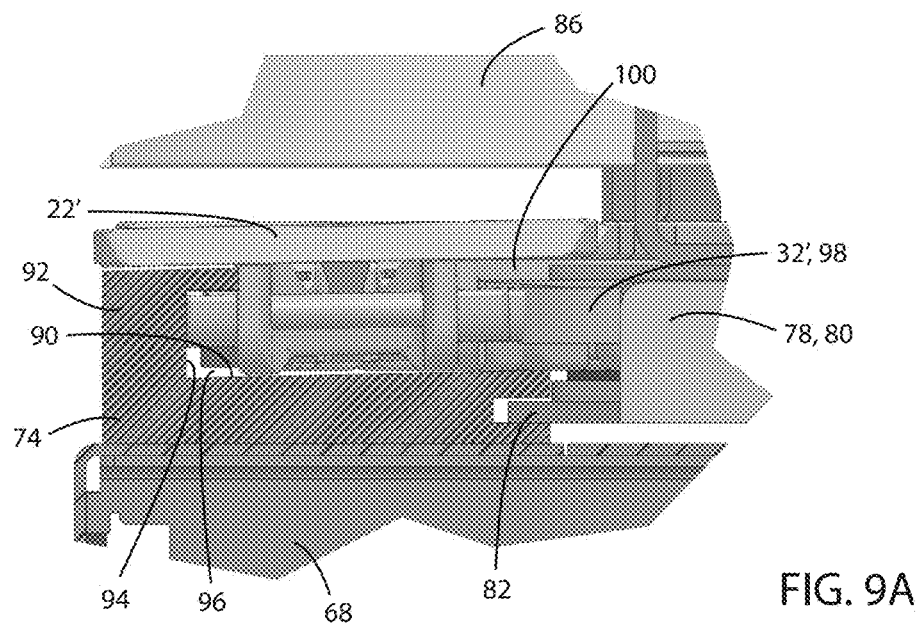
FIG. 9A depicts a detailed view of the cross-sectional view of FIG. 8, showing the left-hand upper rail and the conveyor chain riding thereon.
Figure 9B:
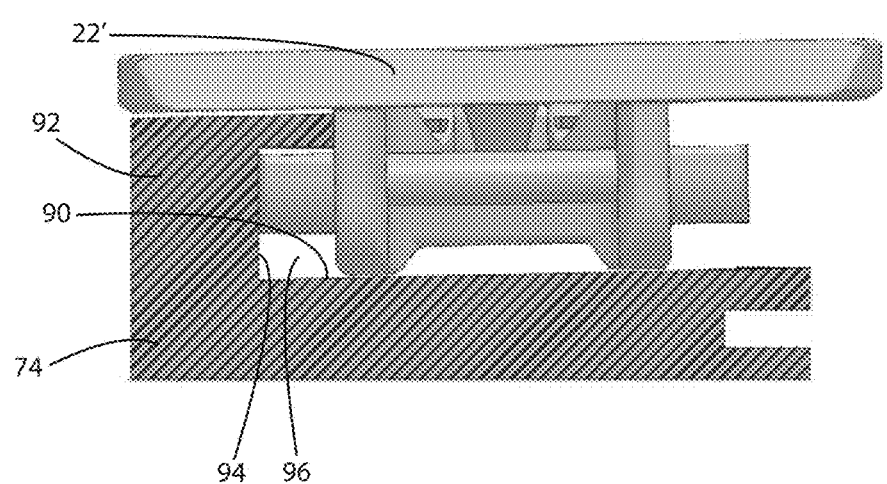
FIG. 9B depicts a view identical to FIG. 9A, but with only the conveyor chain and rail shown.

As shown in FIGS. 8 and 9A&B, each of the upper rails (74) comprises a support surface (90) and an outboard flange (92). Each outboard flange (92) comprises one or more guide surfaces (94) that is configured to slideably engage with the conveyor chain (22') as the portion of the conveyor chain riding on the support surface (90) moves along the respective rail (74) or is in compression. The outboard flanges also preferably each form a channel (96) that prevent the conveyor chain (22') from lifting off of the support surface (90) of the respective rail (74) when the portion of the conveyor chain riding thereon is in compression. Preferably, and as is most apparent in FIG. 9, the support surface (90) of each of the upper rails (74) is sloped slightly such that the support surface slopes downward as it extends outboard of the center plane of the accumulator (20'). Preferably the slope is less than five degrees. Even more preferably, the slope is less than two degrees and more than one degree. As explained in greater detail below, even this slight slope is advantageous in that it ensures that the portion of the conveyor chain (22') riding on the support surface (90) will engage guide surface(s) of the rail (74) rather than buckle inboard when the portion of the conveyor chain is initially to be put into compression.

FIG. 10 shows a detailed cross-sectional view of the accumulator (20') taken about a vertical plane parallel to the longitudinal direction of the accumulator and shows the interaction between the conveyor chain (22') and the upper turnaround wheel (32') as the conveyor chain swings around the turnaround wheel. The upper turnaround wheel (32') comprises a main disk (98) and low-friction ring (100) (which is preferably formed of polymeric material). The low-friction ring (100) is mounted on the upper side of the main disk (98) and, as shown in FIG. 10, extends beyond the radius of the main disk, thereby providing the turnaround wheel (32') with an annular lip (102). The annular lip (102) is configured to vertically interlock with the conveyor chain (22') to prevent the conveyor chain from lifting off of the turnaround wheel (32') (which could otherwise happen when chain tension is high). The outermost annular face (104) of the main disk (98) is frustoconical and tapers inward slightly as it extends upward. The taper angle is preferably between one and three degrees. The conveyor chain (22') bears against the annular face (104) of the main disk (98) and, as shown in FIG. 10, the taper angle causes the conveyor chain to bank as the conveyor chain swings around the turnaround wheel (32'). Alternatively or in addition, the outer support member (88) could extend above the turnaround wheel (32') to force the conveyor chain (22') to bank as the conveyor chain swings around the turnaround wheel (32').

In operation, the above-mentioned configuration of the accumulator (20') provides the accumulator with superior performance. Since the upper rails (74) lack any inboard flange or guide face, the conveyor chain (22') can transfer onto the turnaround wheel (32') without first having to be lifted upward off of the respective upper rail (74). Likewise, the conveyor chain (22') can transfer from the turnaround wheel (32') onto the respective upper rail (74) without being lowered. This greatly reduces the likelihood that articles will topple over as they ride on the conveyor chain (22'). When the upper turnaround wheel (32') begins to move away from the proximal end (72) of the accumulator (20'), the portion of the conveyor chain (22') that is riding on infeed side upper rail (74) is momentarily put in compression. If the support surface (90) of that upper rail (74) was horizontal, that compression could cause the conveyor chain (22') to buckle inboard (since the upper rails (74) lack any inboard flange or guide face). The one to two degree slope of the support surface (90) resists such buckling since the slope inherently urges the conveyor chain (22') against the guide surfaces (94) of the outboard flanges (92) of the upper rails (74). It should be appreciated that this too lowers the chances that articles will topple over as they ride on the conveyor chain (22').

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

What is claimed is:

1. A conveyor accumulator for controlling a flow of articles being conveyed, the conveyor accumulator comprising:
    first and second rails, the rails being parallel to each other and defining a parallel vertical center plane therebetween, each of the rails comprising a support surface and a guide surface, the support surfaces sloping downward as they extend outboard of the center plane;
    a turnaround wheel, the turnaround wheel being movable along an axis parallel to the rails and being rotatable about a vertical axis that lies between the guide rails that, together with the turnaround wheel, is movable along the axis parallel to the rails;
    an endless loop conveyor chain, a portion of the conveyor chain having a path that extends along the first rail to the turnaround wheel, partially around the vertical axis of the turnaround wheel, and along the second rail, the portion of the conveyor chain being configured and adapted to convey products positioned thereon, the portion of the conveyor chain being slideable along and supported against gravity by at least the support surfaces of the first and second rails and being prevented from moving outboard from the center plane by the guide surfaces, movement of the portion of the conveyor chain from the first rail to the second rail being guided by the turnaround wheel;
    an infeed drive device, the infeed drive device being operatively coupled to the conveyor chain in a manner such that the infeed drive device can allow and, alternatively, restrain movement of the portion of the conveyor chain on the first rail;
    an outfeed drive device, the outfeed drive device being operatively coupled to the conveyor chain in a manner such that the outfeed drive device can induce and, alternatively, restrain movement of the portion of the conveyor chain on the second rail;
    the turnaround wheel being configured to move along the axis parallel to the rails in a manner extending and, alternatively, contracting the path of the portion of the conveyor chain in response to when the infeed and outfeed drive devices do not allow equal rates of movement of the conveyor chain.

2. A conveyor accumulator in accordance with claim 1 wherein the guide surfaces of the rails extend above the support surfaces of the rails.

3. A conveyor accumulator in accordance with claim 1 wherein the support surfaces slope downward as they extend outboard of the center plane by less than five degrees.

4. A conveyor accumulator in accordance with claim 3 wherein the support surfaces slope downward as they extend outboard of the center plane by less than two degrees and more than one degree.

5. A conveyor accumulator in accordance with claim 1 wherein the turnaround wheel is configured and adapted to cause the conveyor chain to bank as the conveyor chain extends around the turnaround wheel.

6. A conveyor accumulator in accordance with claim 5 wherein the bank is less than five degrees from horizontal.

7. A conveyor accumulator in accordance with claim 6 wherein the bank is between one and three degrees.

8. A conveyor accumulator in accordance with claim 1 wherein the turnaround wheel is supported by a sled that does not rotate with the turnaround wheel but does move along the axis parallel to the rails with the turnaround wheel, the sled comprises a fence, and the fence extends above and partially around the conveyor chain where the conveyor chain extends around the turnaround wheel.

9. A conveyor accumulator for controlling a flow of articles being conveyed, the conveyor accumulator comprising:
    first and second rails, the rails being parallel to each other and defining a parallel vertical center plane therebetween, each of the rails comprising a support surface;
    a turnaround wheel supported by a sled, the turnaround wheel together with the sled being movable along an axis parallel to the rails, the turnaround wheel being rotatable about a vertical axis that lies between the guide rails that, together with the turnaround wheel and sled, is moveable along the axis parallel to the rails;
    an endless loop conveyor chain, a portion of the conveyor chain having a path that extends along the first rail to the turnaround wheel, partially around the vertical axis of the turnaround wheel, and along the second rail, the portion of the conveyor chain being configured and adapted to convey products positioned thereon, the portion of the conveyor chain being slideable along and supported against gravity by at least the support surfaces of the first and second rails;

an infeed drive device, the infeed drive device being operatively coupled to the conveyor chain in a manner such that the infeed drive device can allow and, alternatively, restrain movement of the portion of the conveyor chain on the first rail;

an outfeed drive device, the outfeed drive device being operatively coupled to the conveyor chain in a manner such that the outfeed drive device can induce and, alternatively, restrain movement of the portion of the conveyor chain on the second rail;

the turnaround wheel and sled being configured to collectively move along the axis parallel to the rails in a manner extending and, alternatively, contracting the path of the portion of the conveyor chain in response to when the infeed and outfeed drive devices do not allow equal rates of movement of the conveyor chain, at least one of the turnaround wheel and the sled being configured and adapted to cause the conveyor chain to bank as the conveyor chain extends around the turnaround wheel.

10. A conveyor accumulator in accordance with claim 9 wherein the bank is less than five degrees from horizontal.

11. A conveyor accumulator in accordance with claim 10 wherein the bank is between one and three degrees.

12. A conveyor accumulator for controlling a flow of articles being conveyed, the conveyor accumulator comprising:

first and second guide rails, the rails being parallel to each other and defining a parallel vertical center plane therebetween, each of the rails comprising a support surface;

a turnaround wheel, the turnaround wheel being movable along an axis parallel to the first and second guide rails and being rotatable about a vertical axis that lies between the guide rails that, together with the turnaround wheel, is movable along the axis parallel to the guide rails;

an endless loop conveyor chain, a portion of the conveyor chain having a path that extends along the first rail to the turnaround wheel, partially around the vertical axis of the turnaround wheel, and along the second guide rail, the portion of the conveyor chain being configured and adapted to convey products positioned thereon, the portion of the conveyor chain being slideable along and supported against gravity by at least the supporting surfaces of the first and second guide rails, movement of the portion of the conveyor chain from the first guide rail to the second guide rail being guided by the turnaround wheel without the conveyor chain being vertically lifted from the first and second guide rails;

an infeed drive device, the infeed drive device being operatively coupled to the conveyor chain in a manner such that the infeed drive device can allow and, alternatively, restrain movement of the portion of the conveyor chain on the first guide rail;

an outfeed drive device, the outfeed drive device being operatively coupled to the conveyor chain in a manner such that the outfeed feed drive device can induce and, alternatively, restrain movement of the portion of the conveyor chain on the second guide rail;

the turnaround wheel being configured to move along the axis parallel to the guide rails in a manner extending and, alternatively, contracting the path of the portion of the conveyor chain in response to when the infeed and outfeed drive devices do not allow equal rates of movement of the conveyor chain; and wherein each of the guide rails comprises a guide surface, the support surfaces sloping downward as they extend outboard of the center plane, and the conveyor chain is prevented from moving outboard from the center plane by the guide surfaces of the first and second guide rails.

13. A conveyor accumulator in accordance with claim 12 wherein the turnaround wheel is configured and adapted to cause the conveyor chain to bank as the conveyor chain extends around the turnaround wheel.

* * * * *